(12) United States Patent
Volpert

(10) Patent No.: US 9,464,714 B2
(45) Date of Patent: Oct. 11, 2016

(54) GEAR SHIFTING SYSTEM AND GEAR SHIFTING ELEMENT FOR A GEAR SHIFTING SYSTEM

(71) Applicant: ZF Friedrichshafen AG, Friedrichshafen (DE)

(72) Inventor: Bastian Volpert, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/443,734

(22) PCT Filed: Oct. 10, 2013

(86) PCT No.: PCT/EP2013/071180
§ 371 (c)(1),
(2) Date: May 19, 2015

(87) PCT Pub. No.: WO2014/075856
PCT Pub. Date: May 22, 2014

(65) Prior Publication Data
US 2015/0285375 A1   Oct. 8, 2015

(30) Foreign Application Priority Data

Nov. 19, 2012   (DE) .................. 10 2012 221 065

(51) Int. Cl.
| | |
|---|---|
| *F16H 63/38* | (2006.01) |
| *F16H 63/28* | (2006.01) |
| *F16H 63/30* | (2006.01) |
| *F16H 63/18* | (2006.01) |
| *F16H 63/04* | (2006.01) |
| *F16D 11/00* | (2006.01) |

(52) U.S. Cl.
CPC .............. *F16H 63/28* (2013.01); *F16H 63/04* (2013.01); *F16H 63/18* (2013.01); *F16H 63/304* (2013.01); *F16H 63/3043* (2013.01); *F16H 63/38* (2013.01); *F16D 2011/002* (2013.01); *F16H 2063/3056* (2013.01); *F16H 2063/3083* (2013.01); *F16H 2063/3093* (2013.01); *Y10T 74/20177* (2015.01)

(58) Field of Classification Search
CPC .............................................. F16H 2063/3093
See application file for complete search history.

(56) References Cited

U.S. PATENT DOCUMENTS

| | | | | |
|---|---|---|---|---|
| 1,822,107 A | * | 9/1931 | Murray ........................ | 74/339 |
| 2,556,860 A | * | 6/1951 | Voigt .......................... | 192/53.1 |

(Continued)

FOREIGN PATENT DOCUMENTS

| | | | | |
|---|---|---|---|---|
| WO | WO 2011072945 A1 | * | 6/2011 | ............ F16H 63/30 |
| WO | WO 2012/055386 A1 | | 5/2012 | |

OTHER PUBLICATIONS

PCT Search Report and Written Opinion, Apr. 10, 2014.

(Continued)

*Primary Examiner* — Terence Boes
(74) *Attorney, Agent, or Firm* — Dority & Manning, P.A.

(57) ABSTRACT

A gear shifting device includes a shifting element that is axially shiftable into a shift position through the interaction of a shift pin with an associated groove-like shift gate that changes course in an axial direction. The shift element features, on an inner or outer diameter the shift gate, while the respective shift pin is arranged in a radially displaceable manner opposite the shift gate on a transmission component adjacent to the shift element.

10 Claims, 3 Drawing Sheets

(56) References Cited

U.S. PATENT DOCUMENTS

2001/0006921 A1    7/2001   Reik et al.
2012/0037472 A1    2/2012   Rosemeier et al.
2012/0255382 A1   10/2012   Richter et al.
2013/0112522 A1    5/2013   Granzow et al.
2015/0292618 A1* 10/2015   Volpert ..................... 74/473.36
2015/0330506 A1* 11/2015   Volpert ..................... 74/473.36

OTHER PUBLICATIONS

German Patent Office Search Report, Sep. 9, 2013.

* cited by examiner

GEAR SHIFTING SYSTEM AND GEAR SHIFTING ELEMENT FOR A GEAR SHIFTING SYSTEM

FIELD OF THE INVENTION

The invention relates to a gear shifting device, having a first, rotatably drivable transmission component on which a shift element is arranged in a torque-proof and axially displaceable manner and is axially movable into at least one shift position. The first transmission component is coupled in a torque-proof manner with a transmission component that is arranged adjacent to it and is connectable thereon. An axial shift movement of the shift element into the at least one shift position and/or from this through the interaction of one shift pin is able to be triggered with at least one associated groove-like shift gate, which is designed to be changeable in an axial direction, at least in sections. The invention also relates to a shift element and a coupling body for a gear shifting device.

BACKGROUND

With stage transmissions, gear shifting devices are used in order to couple transmission components of the respective transmission with each other in a torque-proof manner for the presentation of each corresponding transmission ratio relationship. Thereby, usually one shift element is assigned to a gear shifting device, which, depending on the specific arrangement, makes a force-fitting or positive-locking coupling of the respective assigned transmission components upon actuation. Thereby, the respective shift element is typically provided, in a torque-proof and axially displaceable manner, on one of the two transmission components to be connected in a torque-proof manner, and is displaced into a respective shift position by means of an actuator, in which the desired, torque-proof coupling is realized under the prior reduction of any possible prevailing difference in rotational speed between the two transmission components. Depending on the specific arrangement of such actuator system, such an axial shift movement of the respective shift element is thereby initiated mechanically, hydraulically, pneumatically, electrically or through mixed forms.

A gear shifting device of an automated gearbox arises from DE 196 27 980 A1, through which a first, rotatably drivable transmission component can be coupled, in the form of a transmission shaft, with several transmission components that are adjacently located. In the present case, such additional transmission components comprise gear wheels that are rotatably mounted on it. In addition, several shift elements in the form of clutch sleeves are arranged on the transmission shaft in a torque-proof and axially displaceable manner, whereas each of the clutch sleeves is composed of a ring-shaped body, which is provided on an inner circumference with an axially running toothing and is guided through such toothing to a corresponding toothing on the sides of the radial inner transmission shaft.

Each of the sliding sleeves may now, in each case, move axially between a neutral position, in which the respective sliding sleeve does not couple any of the two gear wheels, located axially on both sides, with the transmission shaft, and two shift positions in which, in each case, the transmission shaft is coupled in a torque-proof manner with one gear wheel under the prior reduction of a difference in rotational speed. Thereby, the axial shift movements of the individual sliding sleeves are presented through an electric motor, intermediate transmission ratio stages, and one shift drum in the interaction with a shift fork assigned to the individual clutch sleeves. Thereby, through the electric motor, by means of the intermediate transmission ratio stages, this brings about, on the one hand, an opening of the separating clutch upstream of the transmission shaft and, on the other hand, a corresponding turning of the shift drum at the same time.

The shift drum is provided on a radial outer side with groove-like shift gates, which are designed to be changeable in an axial direction, at least in sections, and in which one shift pin of the respective shift fork runs. If the shift drum is set in rotational motion through the electric motor by means of intermediate transmission ratio stages, the course changeable in an axial direction of the respective shift gate, through the shift pin running thereon, brings about an axial sliding movement of the respective shift fork, which is translated into a corresponding axial displacement of each corresponding clutch sleeve on the transmission shaft. As a result, the respective clutch sleeve is moved axially between its respective neutral position and one of the possible shift positions. Thereby, the shift gates on the shift drum are designed to be changeable in an axial direction in such a manner that, upon a constant rotational motion initiated by the electric motor, a sequential shifting of the individual gears of the automated gearbox takes place with the respective open separating clutch.

SUMMARY OF THE INVENTION

Based on the state of the art described above, it is a task of the present invention to make available a gear shifting device, through which at least one shift movement of a shift element for the torque-proof coupling and/or separation of the two transmission components that are otherwise able to be turned relative to each other can be realized with a compact structure. Additional objects and advantages of the invention will be set forth in part in the following description, or may be obvious from the description, or may be learned through practice of the invention.

The tasks are solved on the basis of the embodiments of the invention described and claimed herein.

In accordance with the invention, a gear shifting device comprises a first, rotatably drivable transmission component, on which a shift element is arranged in a torque-proof and axially displaceable manner, and which can be axially moved into at least one shift position. In this at least one shift position, the first transmission component is thereby coupled in a torque-proof manner with a transmission component that is connectable thereon, which is arranged adjacent to the first transmission component and is otherwise able to be turned relative to it. In addition, an axial shift movement of the shift element into the at least one shift position and/or from this through the interaction of one shift pin is able to be triggered with at least one associated groove-like shift gate, which is designed to be changeable in an axial direction, at least in sections.

Within the meaning of the invention, a "transmission component" is generally understood to mean a rotatable or stationary component of the transmission, such as a transmission shaft, a gear wheel, a housing or a housing part, etc. In particular, at least upon the shifting of individual gears of the transmission, the respective transmission component is involved in the power transmission between an input side and an output side of the transmission. While the first transmission must necessarily concern a rotatably drivable transmission component, such as a transmission shaft or a gear wheel of a transmission ratio stage in accordance with the invention, the transmission that is located adjacent to it and is connectable thereon may likewise either be designed as a rotatably drivable transmission component, thus for example as a transmission shaft, or present as a rotatably mounted spur gear, or even as a stationary component in the form of a transmission housing or a part of a transmission housing. In the case of the first variant, the two transmission components then rotate together after the torque-proof coupling, while, in the latter case, the first transmission component is, with a torque-proof connection, fixed to it with a connectable transmission component.

Within the meaning of the invention, the shift element may be directly involved in the torque-proof connection of the first transmission component to the connectable transmission component, by, with its axial displacement in the respective shift position, it being in contact with the connectable transmission component itself, thus itself transferring a torque from the first transmission component to the connectable transmission component. Thereby, the connectable transmission component for the torque-proof coupling can be provided with an additional component, for example in the form of a coupling body, with which the shift element of the first transmission component is, upon its transfer, in torque-proof contact in the shift position. As an alternative to this, however, the additional connectable transmission component is provided with its own shift element, which is likewise provided in a torque-proof and axially displaceable manner on the sides of the connectable transmission component and is to be moved for the torque-proof coupling of the transmission components at the same time with the shift element provided on the sides of the first transmission component in an associated shift position.

Finally, the gear shifting device in accordance with the invention may either be designed as a simple shifting device by which the associated shift element is able to move from a neutral position only into a shift position, or realized as a dual shifting device by which the associated shift element may be axially displaced from the neutral position, both in a first direction and in a second direction, into a shift position, and thereby makes a torque-proof connection of the first transmission component with a connectable transmission component that is located adjacent to the first transmission component. Furthermore, within the framework of the invention, an arrangement is also conceivable by which there can only be a change between two shift positions; thus, a neutral position of the shift element is not possible.

In accordance with the invention, a shift element of a gear shifting device particularly features a ring-shaped body, which is provided on an inner circumference with an axially running toothing by which the body can be guided, in a torque-proof and axially displaceable manner, through a corresponding toothing to a radial inner transmission component. It is particularly preferable that the ring-shaped body forms a circular ring and is formed by a single element, whereas, in principle, within the framework of the invention, an assembly of the body from several individual parts is conceivable. Such individual parts are then connected to each other at least in a torque-proof manner.

In principle, the shift element in accordance with the invention may also be arranged in such a manner that, in a gear shifting device, upon an axial displacement into a shift position, a positive-locking or force-fitting coupling of the two transmission components is brought about. Such shift element may be designed as a claw sleeve of a claw coupling or claw brake, as a sliding sleeve of a block synchronization, or a similarly structured component, which, after a reduction of any possible difference in rotational speed between the two transmission components, makes the positive-locking coupling. Thereby, a reduction of the difference in rotational speed is either accomplished purely through a tooth meshing of the shift element with an element provided on the sides of the additional transmission component or brought about with the assistance of intermediate components, such as synchronizer rings. In addition, the shift element may also comprise a sliding piston that, when it is displaced, presses together the clutch halves of a force-fitting clutch or brake, such as a multi-disk clutch or brake.

The invention includes the technical teaching that the shift element features, on an inner diameter and/or an outer diameter, at least one associated shift gate, while the respective one shift pin is arranged in a radially displaceable manner, and the shift gate is arranged in a radially opposite manner, to the transmission component adjacent to the shift element. As an alternative or in addition to this, the shift element, on a radial inner diameter and/or a radial outer diameter, accommodates the respective shift pin in a radially displaceable manner, whereas the associated shift gate is arranged to be radially opposite to a transmission component located adjacent to the shift element. In addition, the respective shift pin may be moved through an associated actuator, in each case radially between an initial position and a mesh position, in which it can be introduced into the at least one associated shift gate.

In other words, in each case, the shift pin and the associated groove-like shift gate is provided radially opposite between the shift element and a transmission component located adjacent to this. On the one hand, one of these two components, thus either the shift pin or the shift gate, is thereby provided on an inner diameter or an outer diameter of the shift element, whereas the other element is, conversely to this, placed on a radial outer side or a radial inner side of the adjacent transmission component. If various axial shift movements of the shift element are initiated by such an interaction, depending on the shift pin, with at least one associated shift gate, on the sides of the shift element and one or various radially adjacent transmission components, several pairs from one shift pin and one shift gate can be provided. If there are several such pairs, different combinations are conceivable, with which the shift element, on its inner diameter and/or also on its outer diameter, accommodates several shifting pens, several shift gates, or at least one shift pin and at least one shift gate. Thereby, in each case, the elements thereby opposite to these can only be provided on only one adjacent transmission component or on different adjacent transmission components, but necessarily must be arranged to be radially opposite.

The associated axial shift movement is triggered by the fact that the respective shift pin radially movable through the associated actuator is introduced into the associated shift gate, such that, in accordance with the course changeable in an axial direction, an axial displacement of the shift element relative to the transmission component that is adjacently located is brought about. Since this axial shift movement takes place initially upon the radial displacement of the respective shift pin from the initial position into the mesh position, this axial shift movement of the shift element can be selectively introduced through the actuator. At the same time, the arrangement of the shift pin with the actuator and the provision of the shift gate in compact form is possible. Preferably, the actuator thereby comprises an electrical actuator, such that, compared to a mechanical or a hydraulic actuator system, the control of the shift element is possible with low weight and a low need for installation space. As a whole, the gear shifting device in accordance with the invention can be realized in the area of a transmission in a manner that saves space, whereas it is also the case that several shift elements can be controlled easily and independent of each other through a gear shifting device that is so designed.

In contrast to this, with DE 196 27 980 A1, the shift pins provided on the sides of the shift forks run permanently in the associated shift gates, which are arranged to be on the radial outer side of the shift drum. As a result, the individual shift element may not be individually displaced from a neutral position into a shift position, since axial shift movements of the shift elements are always rigidly carried out according to the turning of the shift drum and the respective design of the shift gates. Thus, the shifting of the gears of the automatic vehicle transmission of DE 196 27 980 A1 is effected in accordance with a rigidly predetermined shifting sequence, such that, for example, a skipping of one or more gears is not possible. Thus, this structure is suitable only for use with an automated transmission. In addition, the housing of the actuator system composed of an electric motor, transmission ratio stages, and a shift drum requires a corresponding installation space, such that, in the case of DE 196 27 980 A1, a compact actuation of the shift elements is not possible.

In the present case, it is clear to the specialist that, with the gear shifting device in accordance with the invention, for the initiation of an axial movement of the shift element up to its transfer into the at least one shift position, a relative rotational speed between the component bearing the shift pin and the component provided with the groove-like shift gate is always required, since, otherwise, the enclosing of the shift pin in the associated shift gate is not translated into an axial sliding movement. This has the consequence that, when the first transmission component is at rest, a shift movement of the shift element cannot be carried out, to the extent that the opposing transmission component, which features either the respective shift pin or the associated shift gate, performs a rotational motion. Furthermore, a gear shifting device in accordance with the invention is to be provided at least with start-up gears on the input side, since, at the beginning of a start-up procedure of the motor vehicle, the output side of the respective motor vehicle transmission is at a standstill. Generally, however a gear shifting device in accordance with the invention can easily be used with all stage transmissions and thereby in particular with motor vehicle transmissions.

According to one embodiment of the invention, on the one hand, the shift element is provided on the outer diameter with a first shift gate, which is radially opposite to a first shift pin provided on the sides of the surrounding housing. On the other hand, on the inner diameter, the shift element features a second shift gate, which on the sides of the one connectable transmission component is accommodated a second shift pin in a radially opposite manner. Thereby, through the enclosing of the second shift pin in the second shift gate, an axial shift movement of the shift element into a shift position coupling the first transmission component with a connectable transmission component is brought about, whereas, by means of the insertion of the first shift pin into the first shift gate, an axial shift movement of the shift element back into a neutral position can be presented. In other words, the shift element is thus provided with two shift gates, one of which is arranged on the outer diameter, and may interact with a shift pin provided on the sides of a housing for the transfer of the shift element into its neutral position, whereas the other shift gate is formed on the inner diameter of the shift element and, in the interaction with a shift pin arranged on the sides of the connectable transmission component, presents a transfer of the shift element into a shift position.

Thereby, such an arrangement has the advantage that, through the shift pins and the associated shift gates, the axial shift movements of the shift element can be controlled between a neutral position and a shift position, in which the first transmission component is coupled in a torque-proof manner with the connectable transmission component. Through the arrangement of the second shift pin and the second shift gate between the shift element and the connectable transmission component, it is also possible to design the axial shift movement of the shift element in its position in relation to a position and, if necessary, a movement of the connectable transmission component. This is because the nature of the course of the second shift gate in an axial direction defines the extent by which, upon the enclosing of the second shift pin, a relative movement oriented in a circumferential direction between the shift gate and the shift pin is implemented in an axial sliding movement of the shift element. For example, a clean engaging of two toothings can be defined, by the shift element being displaced in the shift position in such a manner that the teeth designed on the shift element always precisely enter the inter-teeth spaces of the corresponding toothing.

Thereby, with respect to the second shift gate, a course in an axial direction is to be shaped in such a way that a complete transfer of the shift element into its shift position, up to the torque-proof coupling of the first transmission component and the connectable transmission component, can always be carried out. Since, particularly, the second shift pin and the second shift gate are located between the shift element and the connectable transmission component, starting from a common rotational speed of the two transmission components to be coupled, there is no longer a relative movement between the second shift pin and the second shift gate in a circumferential direction, such that an axial movement of the shift element is no longer forced through these two shift elements. In particular, the second shift gate is thereby designed in such a manner that a force component oriented in a circumferential direction is not too large upon enclosing the second shift pin, and thereby held an early synchronization of the rotational speed takes place prior to reaching the shift position of the shift element. Otherwise, in particular, the problem could arise that the two transmission components run with the same rotational speed, but are not yet coupled with each other in a torque-proof manner.

Preferably, the first shift gate is introduced in the outer diameter of the shift element, and the second shift gate is introduced in the inner diameter of the shift element, in such a manner that the two shift gates run opposite to each other. In addition, each shift gate steadily passes to its respective two ends through transition areas into the outer diameter of the body. By means of the transition areas, the respective shift pin can then cleanly enter the associated shift gate, if such shift pin and the shift gate are not initially overlapped in a circumferential direction at the beginning of the transfer of the shift pin into the mesh position.

According to an additional arrangement of the invention, the shift element is provided, on at least one axial front side, with an axially protruding and revolving claw toothing, which is thereby turned towards a connectable transmission component. In addition, the one connectable transmission component is connected in a torque-proof manner to the coupling body located axially between the one connectable transmission component and the shift element, which is provided, on a front side turned towards the shift element, with a toothing designed in a corresponding manner to the claw toothing of the shift element, and is coupled, in an axially movable manner, with the connectable transmission component through an intermediate spring element. The one claw toothing of the shift element and the one toothing of the coupling body are in tooth meshing with each other in the at least one shift position of the shift element. In this case, the shift element is designed as a claw sleeve, which, in the shift position of a positive-locking coupling of the first transmission component, is presented with the connectable transmission component by means of a tooth meshing with the coupling body.

Thereby, the placement of a spring element between the coupling body and the connectable transmission component has the advantage that any shock that arises upon the tooth meshing of the shift element with the coupling body is not transferred to the additional component, but is compensated through the intermediate spring element. However, within the meaning of the invention, a toothing provided on the shift element is also arranged on the front side of the shift element on a radial outer side, and is thus designed in the manner of an outer claw toothing, whereas the toothing corresponding to this is to be accordingly provided, as an inner claw toothing, on the sides of the coupling body, on the front side, and on an inner circumference of the coupling body. In principle, it is also conceivable within the framework of the invention to provide the coupling body not as a separate element that is coupled with the additional transmission component through a spring element, but to rigidly connect this to the additional transmission component or to also directly provide the additional transmission component with the corresponding toothing. In doing so, production costs are accordingly reduced, but shock compensation is not enabled.

Thereby, within the meaning of the invention, the coupling body is designed in particular with a body that can be connected in a torque-proof manner to the connectable transmission component. In addition, a shift gate designed to be changeable in an axial direction, at least in sections, is introduced into a radial outer side or a radial inner side of the body. As an alternative to this, on a radial outer side or a radial inner side, the body of the coupling body guides a shift pin with an associated actuator. A coupling body designed in such a manner is accordingly provided with one of the two elements through which, in their interaction, an axial shift movement of the shift element may be initiated. Thus, with the provision of a coupling body as well, a shift pin with the assigned shift gate can easily be provided between the shift element and the attachable transmission component, and a sliding movement of the shift element in relation to a position and, if necessary, a movement, of the connectable transmission component can thus easily be controlled. In particular, the body of the coupling body is thereby arranged in cylinder shape.

It is particularly preferable that the embodiment of a gear shifting device, with which a pair of shift pins/shift gates is provided between the shift element and the housing, along with the shift element and the connectable transmission component, is combined with an arrangement of a gear shifting device, with which a coupling body is arranged on the sides of the connectable transmission component. In an additional form of this combination, the second shift pin and the actuator associated with this are thereby accommodated on a radial outer side of a shaft stub of the coupling body axially protruding through the one toothing. Thus, the body of the coupling body is provided, on the one hand, with an axially protruding toothing, whereas a shaft stub axially projects through this toothing, on the outer diameter of which the shift pin with the associated actuator is provided. By means of such an arrangement, on the one hand, the toothing corresponding to the claw toothing and, on the other hand, the shift pin with the actuator, can be placed on the coupling body.

An additional advantageous embodiment of the invention provides that at least one locking device is provided radially between the shift element and the first transmission component, which, apart from axial shift movements, prevents axial movements of the shift element from a neutral position and the at least one shift position. In other words, a locking device is accommodated between the shift element and the first transmission component, which prevents the axial movements of the shift element that are not brought about through the meshing of the respective one shift pin in the associated shift gate. This has the advantage that, after the transfer of the shift element into the at least one shift position or into the neutral position, the respective one shift pin need not remain in the shift gate in order to hold the shift element in this position. Instead, the locking device provides for the shift element remaining in the desired position.

In an additional form, this variant comprises the at least one locking device for each ball, which is guided, in a radially movable manner, on the sides of the first transmission component or the shift element, and is preloaded against a locking contour by means of a spring element. Thereby, the locking contour is designed in a manner radially opposite to the one ball at the shift element or the first transmission element and arrives both in the neutral position and in the at least one shift position of the shift element, in each case with one locking recess axially in an overlap with the one ball. Through the design of the locking device as a ball locking mechanism, the desired fixing of the shift element in the neutral position and in the at least one shift position can be realized in a simple manner. However, within the meaning of the invention, it is also conceivable to provide a locking device between the shift element and another transmission component, for example, a surrounding housing.

In accordance with the invention, the first transmission component and each connectable transmission component comprise a transmission shaft. Consequently, these two transmission components can be coupled with each other in a torque-proof manner through the gear shifting device in accordance with the invention.

The invention is not limited to the specified combination of characteristics of the equivalent claims or any of the claims dependent on them. There are also options for combining individual characteristics with one another, and as they arise from the claims, the following description of one embodiment of the invention or directly from the figures. Any reference of the claims to the drawings through the use of reference signs should not restrict the scope of protection of the claims.

BRIEF DESCRIPTION OF THE DRAWINGS

Additional measures that improve the invention are shown in more detail below, together with the description of a preferred embodiment of the invention, which makes reference to the drawings shown in the figures. The following is shown.

DETAILED DESCRIPTION

Figure 1A:
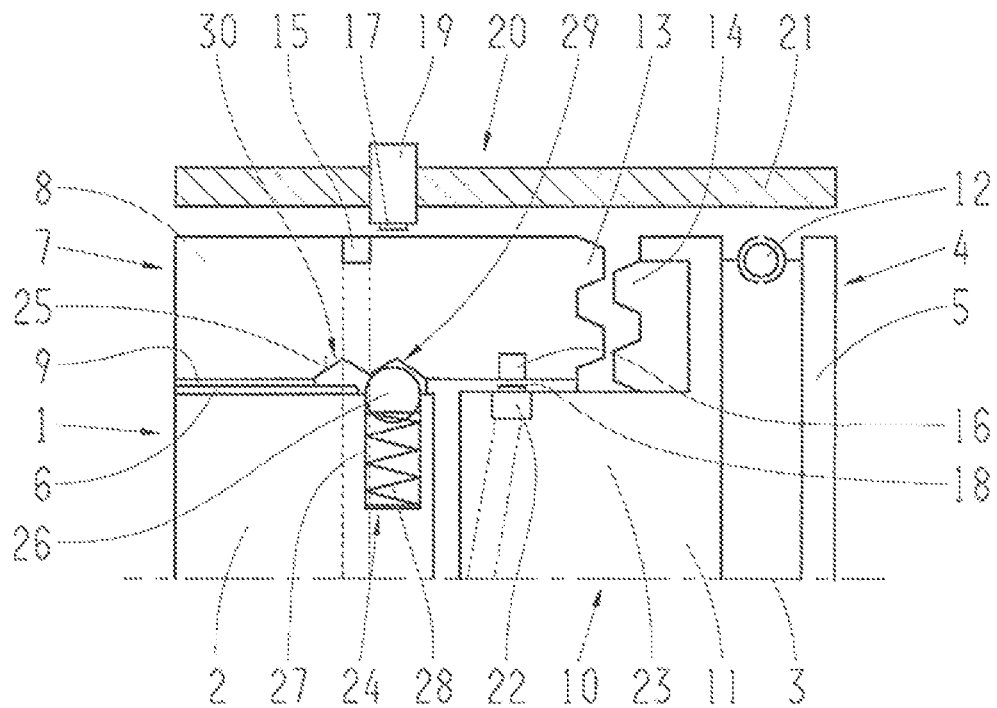
FIGS. 1A to 1F are schematic views of a gear shifting device according to a preferred embodiment of the invention, shown in different shifting states of the gear shifting device.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Each of FIGS. 1A to 1F shows a schematic view of a gear shifting device in accordance with a preferred embodiment of the invention, whereas, through FIGS. 1A to 1F, individual shifting states of this gear shifting device are thereby presented. In the following, the structure of the gear shifting device is to be initially described on the basis of FIG. 1A:

The gear shifting device shown in FIG. 1A comprises a shifting device of a stage transmission, for example an automated car transmission. Thereby, this gear shifting device comprises a first transmission component 1, which in the present case is designed as a transmission shaft 2 and is able to rotate around an axis of rotation 3. In a manner axially adjacent to the first transmission component 1, an additional transmission component 4 is provided; in the present case, this is likewise mounted in a manner rotatable around the axis of rotation 3 and is thus arranged in a coaxial manner as the transmission shaft 5 coaxial to the transmission shaft 2. The transmission shaft 2 and the transmission shaft 5 can be coupled with each other in a torque-proof manner through the gear shifting device in accordance with the invention.

As can also be see in FIG. 1A, the transmission shaft 2 features a synchronization toothing 6 on a radial outer side, through which a shift element 7 set radially on the outside of the transmission shaft 2 is guided in a torque-proof and axially displaceable manner. Thereby, this shift element 7 is formed from a ring-shaped, one-piece body 8, which, on an inner circumference, is provided with a toothing 9 that meshes with the synchronization toothing 6. If there is a simultaneous axial displacement capability, the torque-proof arrangement of the shift element 7 on the transmission shaft 2 is thereby realized by the course of the teeth of the synchronization toothing 6 and the toothing 9 that is oriented in an axial direction.

In an axial manner between the transmission shaft 2 and the shift element 7, on the one hand, and the transmission shaft 5, on the other hand, a coupling body 10 is also provided, which, with an essentially cylindrical body 11, is likewise arranged on the axis of rotation 3 and coupled with the transmission shaft 5. In the present case, this coupling is thereby formed through a synchronization toothing (not shown in the present case) between the coupling body 10 and the transmission shaft 5 and, if there is a torque-proof connection between these two components, allows axial movements of the coupling body 10 in respect of the transmission component 5. However, axial movements are thereby limited by a spring element 12 that is placed in an axial manner between the transmission shaft 5 and the coupling body 10, and preloads the coupling body in an axial manner in the direction of the shift element 7.

Moreover, on a front side turned towards one of the transmission shafts 5, the shift element 7 is provided with a claw toothing 13, the teeth of which thereby protrude in an axial manner in the direction of the coupling body 10 and are formed in a revolving manner on the shift element 7. On the sides of the coupling body 10, the claw toothing 13 is thereby opposite to a toothing 14 that extends from the cylindrical body 11 in an axially protruding manner in the direction of the shift element 7 and is designed in a manner corresponding to the claw toothing 13 of the shift element 7. Upon a movement of the shift element 7 from a neutral position to be seen in FIG. 1A into a shift position, the claw toothing 13 and the toothing 14 corresponding to it are brought into a mesh with each other, such that, as a result, the shift element 7 is connected in a positive-locking manner to the coupling body and thus the transmission shaft 2 with the transmission shaft 5.

For the targeted introduction of the axial movements of the shift element 7 between the neutral position and the shift position, the shift element 7 is provided, on the one hand, on an outer diameter of its body 8, with a first shift gate 15 and, on the other hand, on an inner diameter, with a second shift gate 16 in the extension of the toothing 9, which, in the interaction with one associated shift spin 17 or 18, may in a targeted manner initiate the respective axial displacement of the shift element 7. Thereby, a first shift pin 17 is accommodated together with an associated actuator 19 by a transmission component 20 that is radially adjacent to the shift element 7, with which, in the present case, the shift element 7 comprises a radially surrounding housing 21 of the transmission. However, a second shift pin 18 is thereby provided in a radially opposite manner to the shift gate 16, by being placed, together with an actuator 22, on an outer diameter of a shaft stub 23, which extends from the part of the body 11 bearing the toothing 14 in the direction of the transmission shaft 2, and thereby axially projects through the toothing 14.

Each of the shift pins 17 and 18 may be displaced by the associated actuator 19 or 22 from an initial position shown in FIG. 1A into a respective mesh position, in which the respective shift pin 17 or 18 may be radially enclosed in the associated shift gates 15 or 16. Thereby, the respective shift pin 17 or 18 is accommodated, in a radially displaceable manner, in the associated actuator 19 or 22. Thereby, the two actuators 19 and 22 are designed as electrical actuators, which, upon a corresponding power supply, initiate the radial movement of the associated shift pin 17 or 18.

Figure 1B:
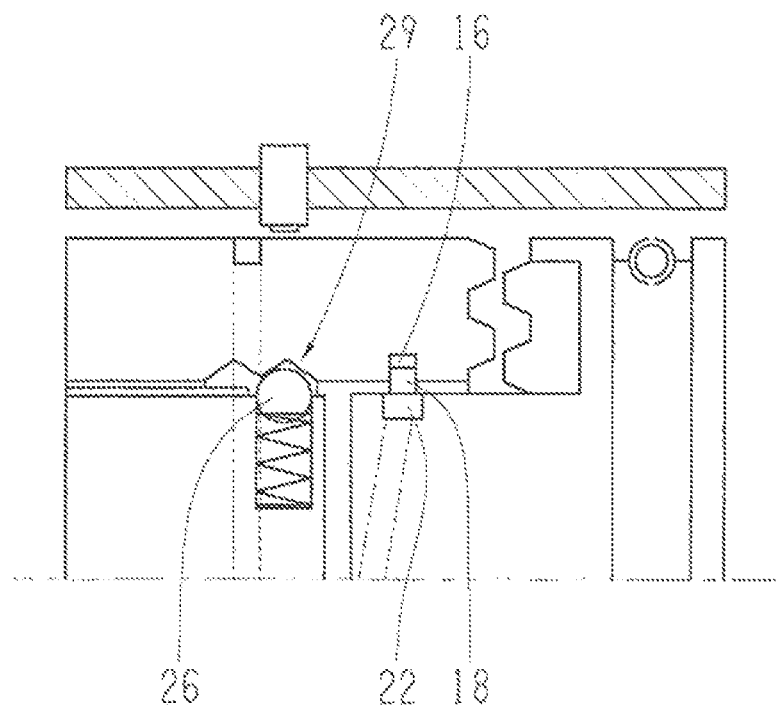
Figure 1C:
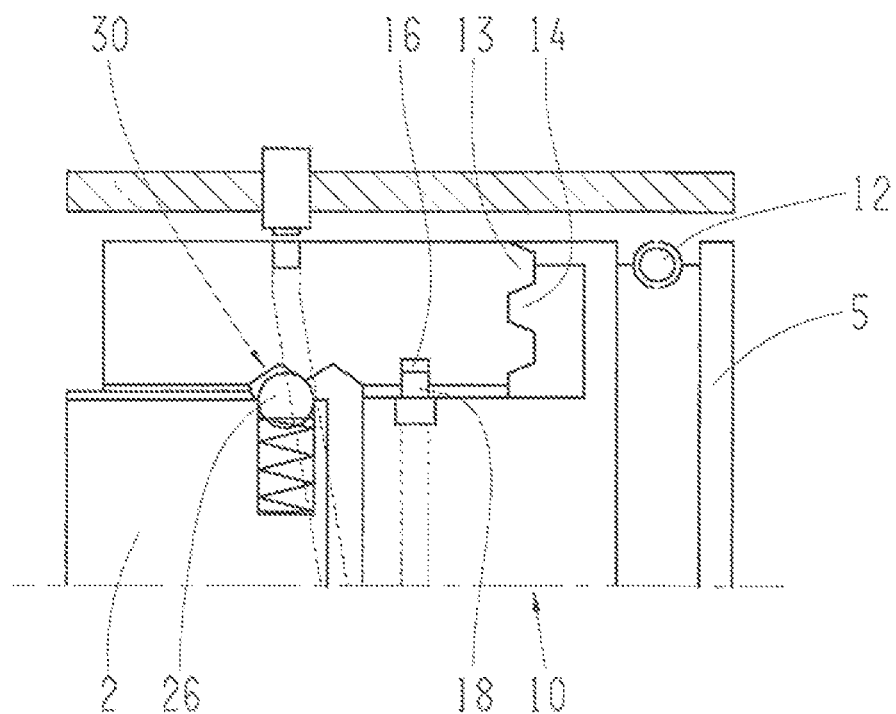

As, with respect to the shift gate 16 in the example from FIG. 1A and with respect to the shift gate 15 in the example from FIG. 1C, it can be seen in each case on the basis of the dashed course, the shift gates 15 and 16 are designed to be changeable in an axial direction, at least in sections, whereas each of the courses of shift gates 15 and 16 thereby features a spiral-shaped character. In addition, these courses of the shift gates 15 and 16 designed to be opposite to each other, such that, in the interaction with the associated shift pin 17 or 18, the shift movements of the shift element 7 that are oriented opposite to each other can be realized.

In addition, both the first shift gate 15 and the second shift gate 16 are equipped with a transition on the input side (which is not shown in the present case), through which, for the first shift gate 15, the outer diameter of the body 8, and, in the case of the second shift gate 16, the inner diameter of the body 8 passes into the respective shift gate 15 or 16, which is designed in groove form. At each end opposing this, a transition area on the output side is also provided; this is likewise not shown in the present case and, through this, the respective shift gate 15 or 16 tapers off back to the outer or inner diameter of the ring-shaped body 8. Thereby, in the neutral position of the shift element 7, the transition area on the input side of the second shift gate 16 is located in an axial manner at the level of the second shift pin 18, while the transition area on the output side of the first shift gate 15 is axially overlapped with the first shift pin 17. Conversely to this, in the shift position of the shift element 7, the transition area on the output side of the second shift gate 16 and the second shift pin 18 is axially located at a level, whereas the transition area on the input side of the first shift gate 15 is axially overlapped with the first shift pin 17.

Furthermore, in a radial manner between the transmission shaft 2 and the shift element 7, a locking device 24 is provided, which is composed of a locking contour 25 and a ball 26 running on it. The ball 26 is guided on the sides of the transmission shaft 2 in a radially movable manner into a boring 27, and is preloaded against the locking contour by means of a spring element 28, which is provided on the inner diameter of the body 8 and defines two locking recesses 29 and 30. Thereby, the locking recess 29 arrives in the neutral position of the shift element 7 with the ball in an axial manner in the overlap, whereas the ball 26 is pressed in the shift position of the shift element 7 through the spring element 28 into the locking recess 30. Thereby, the locking device 24 prevents the shift element 7 from remaining in the neutral position or in the shift position, apart from the axial movements of the shift element 7 brought about by the shift pins 17 and 18 and the shift gates 15 and 16.

In the following, with reference to FIGS. 1A to 1F, a shift movement of the shift element 7 from the neutral position to be seen in FIG. 1A into the shift position and back into the neutral position is to now be described:

In order to initially move the shift element 7 from the neutral position shown in FIG. 1A into the shift position, in which the claw toothing 13 is in tooth meshing with the toothing 14, initially in a first step, the second shift pin 18 moves by means of the associated actuator 22 radially from the initial position shown in FIG. 1A into a mesh position emerging from FIG. 1B, in which the second shift pin 18 can be enclosed in the second shift gate 16. If the second shift gate 16 and the second shift pin 18 are not in the overlap in a circumferential direction when exiting the shift pin 18, the second shift pin 18 initially makes contact on the inner diameter of the shift element 7, until ultimately it can be slid into this through the transition area on the input side of the second shift gate 16. In the following, the course of the second shift gate 16 changeable in an axial direction brings about the fact that, based on the fixed position of the second shift pin 18, an axial displacement of the shift element 7 is forced. Thereby, in the course of this axial displacement, the ball 26 also slides out of the locking recess 29.

Subsequently, the shift element 7 is displaced from the axial position shown in FIG. 1B into the position shown in FIG. 1C, which corresponds to the shift position of the shift element 7. Along this path, in this shift position, the claw toothing 13 of the shift element 7 enters into tooth meshing with the toothing 14 of the coupling body 10, whereas any axial shock that thereby arises is compensated by the spring element 12. However, a course of the second shift gate 16 is thereby selected such that a clean engagement of the toothings 13 and 14 take place; thus, one tooth of the claw toothing 13 at the end of the displacement of the shift element 7 is grasped in the shift position, at all times between two teeth of the toothing 14. Thus, any shock that emerges upon the engagement can be kept low. Through the transition area on the output side of the second shift gate 16, upon reaching the shift position of the shift element 7, the second shift pin 18 is then moved back from the second shift gate 16 into the initial position to be seen in FIG. 1D.

Figure 1D:
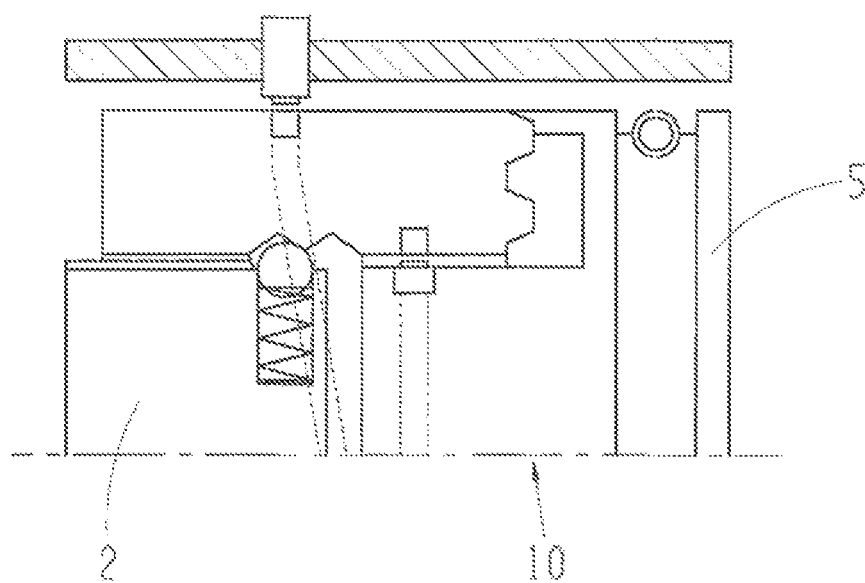

In FIG. 1C and FIG. 1D, the ball 26 also arrives in the overlap with the locking recess 30, which prevents the shift element 7 from unintentionally exiting the shift position. In the shift position of the shift element 7, the transmission shaft 2 and the transmission shaft 5 are now coupled in a torque-proof manner with each other through the shift element 7 and the coupling body 10.

Figure 1E:
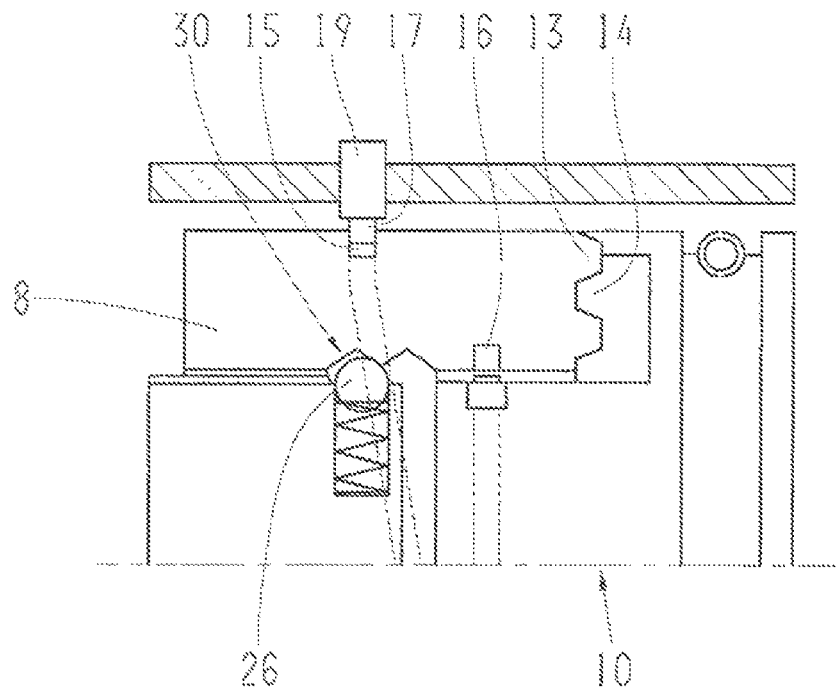

For the return movement of the shift element 7 into its neutral position, upon a step following this, as shown in FIG. 1E, the first shift pin 17 exits through the associated actuator 19 from its initial position into its mesh position, and thereby can enter the first shift gate 15 through the transition area on the input side. If once again the transition area on the input side of the first shift gate 15 and the first shift pin 17 in a circumferential direction are thereby not in the overlap, the first shift pin 17 initially runs on the outer diameter of the body 8 and, upon a further turning of the body 8, arrives through the transition area on the input side in the first shift gate 15. Since the first shift gate 15 is thereby designed to run opposite to the second shift gate 16, in the interaction with the fixed position of the first shift pin 17, an axial displacement of the shift element 7 is forced in the direction of its neutral position, whereas the ball 26 thereby slides out of the locking recess 30. Thereby, in the course of the axial displacement, the claw toothing 13 is separated from the toothing 14, such that, in turn, the shift element 7 may turn relative to the coupling body 10, and the transmission shafts 2 and 5 are accordingly no longer coupled with each other.

Figure 1F:
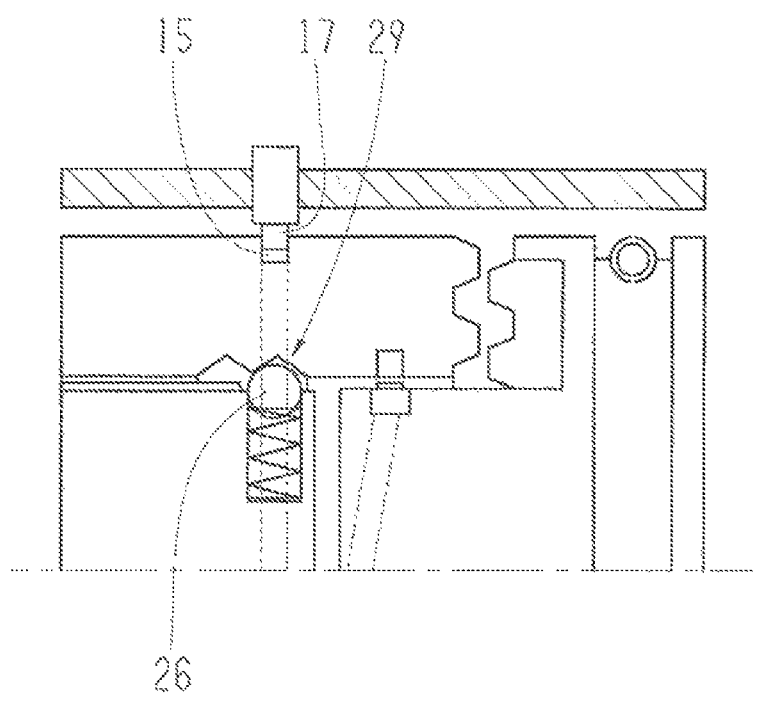

Finally, as shown in FIG. 1F, the shift element 7 in turn reaches its neutral position, whereas the first shift pin 17 is subsequently pushed back through the transition area on the output side of the first shift gate 15 into its initial position. At the same time, the ball 26 comes into the overlap with the locking recess 29. Thus, in turn, the state shown in FIG. 1A is reached.

By means of the arrangement of a gear shifting device in accordance with the invention, shift movements of a shift element 7 may be controlled in a compact manner, and accurately and independently.

Modifications and variations can be made to the embodiments illustrated or described herein without departing from the scope and spirit of the invention as set forth in the appended claims.

The invention claimed is:

1. A gear shifting device, comprising:
   a first rotatably drivable transmission component;
   a shift element arranged in a torque-proof and axially displaceable manner on the first transmission component, the shift element axially movable into a shift position, the shift element further comprising a second shift gate defined in an inner diameter surface of the shift element as a groove that changes course in the axial direction along the shift element;
   a second transmission component arranged adjacent to and connectable in a torque proof manner with the first transmission component upon an axial shift movement of the shift element to the shift position;
   a third transmission component adjacent to the shift element and further comprising a radially displaceable second shift pin radially opposite to the second shift gate, the second shift pin triggered by an actuator;
   upon triggering, the second shift pin moves radially into the second shift gate, wherein the axially changing course of the second shift gate moves the shift element from a neutral position into the shift position to connect the first transmission component in a torque proof manner to the second transmission component; and a first shift gate defined in an axially changing course as a groove on an outer diameter surface of the shift element radially opposite to a first shift pin, the first shift pin triggered by a respective actuator, wherein upon triggering, the first shift pin moves radially into the first shift gate causing axial shift movement of the shift element back into the neutral position.

2. The gear shifting device according to claim 1, wherein the first shift pin is provided on a radially inner side of a surrounding housing of the transmission.

3. The gear shifting device according to claim 2, wherein the shift element comprises a claw toothing at an axial front side thereof towards the second transmission component, the second transmission component comprising a coupling body that is axially movable on the second transmission component and has a complimentary toothing on a side thereof facing the shift element, the coupling body biased towards the shift element by a spring element, wherein in the shift position of the shift element, claw toothing on the shift element meshes with the complimentary tooting on the coupling body.

4. The gear shifting device according to claim 3, wherein the second shift pin and associated actuator are on a radial outer side of a shaft stub of the coupling body that protrudes axially beyond the complimentary toothing towards the first transmission component.

5. The gear shifting device according to claim 1, further comprising a locking device provided radially between the shift element and the first transmission component, the locking device preventing unintended axial movement of the shift element from the neutral position and the shift position.

6. A shift element for use in a gear shifting device according to claim 1, the shift element comprising a ring-shaped body having axially running toothing on an inner circumferential surface by which the body is guided axially along the first transmission component, the first shift gate defined in an outer diameter surface of the body with its axially changing course, and the second shift gate defined on an inner diameter surface of the body with its axially changing course.

7. The shift element according to claim 6, wherein the body further comprises claw toothing on an axial front side thereof.

8. The shift element according to claim 6, wherein the axially changing courses of the first shift gate and the second shift gate run in opposite axial directions and further comprise transition areas.

9. A coupling body for use in a gear shifting device according to claim 2, the coupling body connectable in a torque-proof and axially movable manner to the second transmission component, the coupling body further comprising the second shift pin configured to engage in a shift gate defined in the shift element with an axially changeable course.

10. The coupling body according to claim 9, further comprising an axially protruding toothing on an end thereof, and a shaft stub that axially projects through the toothing, the second shift pin with associated actuator configured on the shaft stub.

* * * * *